United States Patent
Kimura

(10) Patent No.: US 9,554,054 B2
(45) Date of Patent: Jan. 24, 2017

(54) IMAGING APPARATUS AND ITS CONTROL METHOD AND PROGRAM

(71) Applicant: CANON KABUSHIKI KAISHA, Tokyo (JP)

(72) Inventor: Masafumi Kimura, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/518,230

(22) Filed: Oct. 20, 2014

(65) Prior Publication Data

US 2015/0109522 A1 Apr. 23, 2015

(30) Foreign Application Priority Data

Oct. 23, 2013 (JP) .................. 2013-220217
Sep. 11, 2014 (JP) .................. 2014-185232

(51) Int. Cl.
*H04N 5/235* (2006.01)
*H04N 5/232* (2006.01)
(Continued)

(52) U.S. Cl.
CPC ........... *H04N 5/2353* (2013.01); *H04N 5/217* (2013.01); *H04N 5/2352* (2013.01); *H04N 5/23245* (2013.01); *H04N 5/3572* (2013.01)

(58) Field of Classification Search
CPC .... H04N 5/3572; H04N 5/2353; H04N 5/217; H04N 5/23245; H04N 5/2352
(Continued)

(56) References Cited

U.S. PATENT DOCUMENTS

2010/0053358 A1* 3/2010 Kodama .............. G06T 7/204
 348/222.1
2013/0044256 A1 2/2013 Hiasa et al.
(Continued)

FOREIGN PATENT DOCUMENTS

EP 2230835 A2 * 9/2010 ......... H04N 5/23212
JP 2008-092005 A 4/2008
(Continued)

OTHER PUBLICATIONS

Ng, et al., "Light Field Photography with a Hand-held Plenoptic Camera", 2005, Stanford University Computer Science Tech Report CSTR Feb. 2005, pp. 1-11 (Apr. 2005).
(Continued)

Primary Examiner — Nhan T Tran
(74) Attorney, Agent, or Firm — Carter, DeLuca, Farrell & Schmidt, LLP

(57) ABSTRACT

The imaging apparatus has: a first exposure mode in which an exposure condition is determined based on pixel data generated by photoelectrically converting, by a plurality of pixels, light rays entering through a pupil division unit, a state of vignetting of the photographing optical system is determined based on information about a construction of a photographing optical system, and an exposure condition is determined based on the pixel data selected from the pixel data generated in accordance with the vignetting state; and a second exposure mode in which an exposure condition is determined based on data obtained by adding the generated pixel data with respect to the exit pupil area of the photographing lens.

17 Claims, 6 Drawing Sheets

(51) Int. Cl.
  *H04N 5/357*    (2011.01)
  *H04N 5/217*    (2011.01)
(58) Field of Classification Search
  USPC .......................... 348/251, 350, 362, 379, 241
  See application file for complete search history.

(56)             References Cited

U.S. PATENT DOCUMENTS

2013/0222652 A1*  8/2013  Akeley ................. H04N 5/217
                                                348/241
2014/0176592 A1*  6/2014  Wilburn ............. H04N 5/23212
                                                345/589
2015/0222833 A1*  8/2015  Murata ................... G02B 7/34
                                                250/208.1

FOREIGN PATENT DOCUMENTS

JP       2010-217618 A      9/2010
JP       2011-197278 A     10/2011
JP       2012-124622 A      6/2012
KR      2008-0025016 A      3/2008
WO      2007/044725 A2      4/2007

OTHER PUBLICATIONS

European Search Report issued in corresponding application No. 14003617.9 on Mar. 3, 2015.
Office Action issued in corresponding Korean Application No. 10-2014-0143897 mailed Jul. 12, 2016.

\* cited by examiner

IMAGING APPARATUS AND ITS CONTROL METHOD AND PROGRAM

BACKGROUND OF THE INVENTION

Field of the Invention

The present invention relates to an imaging apparatus and, more particularly, to an exposure control technique of an imaging apparatus which can obtain a plurality of parallactic images.

Description of the Related Art

In the related arts, an automation of exposure (what is called AE) has been considered in a case where an imaging apparatus is automated. In recent years, many systems for obtaining two or more parallactic images have been proposed and techniques about exposure control of them have also been proposed. For example, Japanese Patent Application Laid-Open No. 2012-124622 discloses such a photographing system having a plurality of imaging apparatuses that an object is photographed under different exposure conditions of those imaging apparatuses and, thereafter, photographed images are combined by an image processing.

Japanese Patent Application Laid-Open No. 2011-197278 discloses such an imaging system that a program diagram is designed so as to give a priority to a parallax and a parallax-priority exposure condition is determined.

A camera system which can obtain light field information has been disclosed in Ren Ng, et al., "Light Field Photography with a Hand-held Plenoptic Camera", 2005, Computer Science Technical Report CTSR. A method of performing a focus adjustment (what is called refocus) after an image is obtained is disclosed in such a system.

However, according to the related art disclosed in the foregoing Patent Literature, a desired exposure is not necessarily obtained in the system which can simultaneously obtain many parallactic images from one imaging element. In other words, although the invention disclosed in Japanese Patent Application Laid-Open No. 2012-124622 can be applied to an imaging system (that is, multocular camera) in which a plurality of imaging apparatuses are combined, it is not easily implemented in a monocular camera.

According to the invention disclosed in Japanese Patent Application Laid-Open No. 2011-197278, although such an idea that there is a parallax-priority function can be realized, it cannot cope with a case where a complex vignetting of a photographing optical system exists, or the like.

According to the invention disclosed in Ren Ng, et al., "Light Field Photography with a Hand-held Plenoptic Camera", 2005, Computer Science Technical Report CTSR, although an idea such as refocus, change in iris value, or the like is widely disclosed, nothing is disclosed about how to determine the exposure condition when obtaining the light field information.

It is, therefore, an aspect of the invention to provide an imaging apparatus in which even in a state where there is a vignetting in a photographing optical system, an exposure condition corresponding to a function which has preferentially been set by the user can be determined.

SUMMARY OF THE INVENTION

To accomplish the above aspect, according to the invention, an imaging apparatus having an imaging unit which has a plurality of pixels for photoelectrically converting an optical image of an object formed by a photographing optical system including a photographing lens and is configured to generate pixel data by using outputs of the plurality of pixels, comprises: a pupil division unit configured to restrict rays of light from the photographing optical system which enter the pixels of the imaging unit, to a ray of light from a specific exit pupil area of the photographing lens; an exposure condition determination unit configured to determine an exposure condition of the imaging unit on the basis of divided pixel data which is generated by photoelectrically converting, by the plurality of pixels, the rays of light which enter through the pupil division unit; and a vignetting determination unit configured to determine a state of vignetting of the photographing optical system on the basis of information about a construction of the photographing optical system, wherein the exposure condition determination unit has a first exposure mode for deciding the exposure condition on the basis of the pixel data selected from the divided pixel data in accordance with the state of vignetting and a second exposure mode for deciding the exposure condition on the basis of data obtained by adding the divided pixel data with respect to the exit pupil area of the photographing lens.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the present invention will be described in detail below with reference to the drawings.

First Embodiment

The first embodiment of the invention will be described hereinbelow with reference to FIGS. 1 to 6B.

Figure 1:
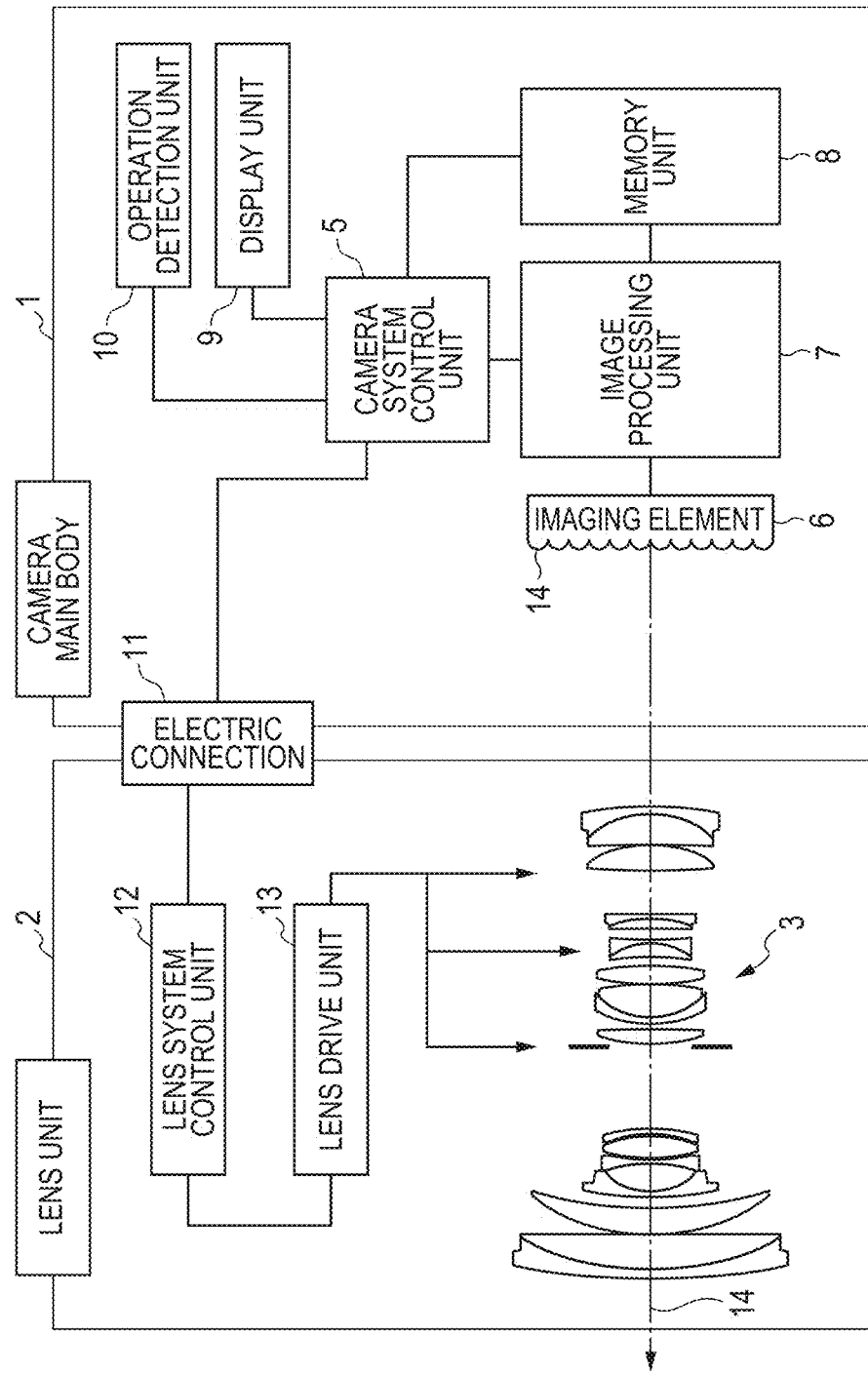
FIG. 1 is a block diagram of an imaging apparatus according to an embodiment of the invention.

FIG. 1 is a block diagram of an imaging apparatus according to the present embodiment. The imaging apparatus is a camera system comprising a camera main body 1 and a lens unit 2 like, for example, a digital camera or the like. The imaging apparatus has an imaging system, an image processing system, a recording and reproducing system, and a control system. The lens unit 2 may be also arranged to be detachable to the camera main body 1.

As will be described hereinafter, the imaging apparatus according to the present embodiment has a photographing optical system and an imaging unit which enable light field information to be obtained, and a determination of an exposure condition which is made by using pixel data obtained by them is controlled in accordance with the feature of the invention. In this manner, the invention is based on a technical idea for determining exposure conditions such as iris position, exposure time, and the like of the imaging apparatus which can obtain the light field information.

The imaging system includes: a photographing optical system 3 containing a photographing lens, a focus lens, and the like; and an imaging element 6. The image processing system includes an image processing unit 7. The recording and reproducing system includes a memory unit 8 and a display unit 9. The control system includes a camera system control unit 5, an operation detection unit 10, a lens system control unit 12, and a lens drive unit 13. The lens drive unit 13 can drive the focus lens, a vibration correction lens, an iris, and the like. In the present embodiment, the operation detection unit 10 and the memory unit 8 construct a user setting unit. That is, exposure modes, which will be described hereinafter, are set and stored.

The imaging system is an optical processing system for focusing light from an object onto an image pickup plane of the imaging element 6 through the photographing optical system 3. Microlenses (hereinbelow, referred to as ML) are arranged in a lattice shape on the surface of the imaging element 6, thereby forming what is called a microlens array (hereinbelow, referred to as MLA) 14. In the present embodiment, the MLA 14 constructs a pupil division unit. Details of a function and a layout of the MLA 14 will be described hereinafter with reference to FIG. 3. Since a focus evaluation amount and a proper exposure amount are obtained from the imaging element 6 by the operation of the pupil division unit, the photographing optical system 3 is properly adjusted on the basis of a signal showing those amounts. Thus, the object light of the proper light amount is exposed to the imaging element 6 and an optical image of the object can be focused near the imaging element 6.

The image processing unit 7 has therein an A/D converter, a white balance unit, a gamma correction unit, an interpolation operation unit, and the like and can generate an image for recording. An exposure condition determination unit, a vignetting determination unit, and an image generation unit serving as a main feature of the invention can be also included in the image processing unit 7. In the present embodiment, a case where those component elements are arranged in the camera system control unit 5 is presumed.

The memory unit 8 has a processing unit necessary for recording in addition to a storage unit for actually storing data. The memory unit 8 outputs data to a recording unit and generates and stores an image which is output to the display unit 9. The memory unit 8 compresses an image, a moving image, a voice sound, or the like by using a predetermined method.

The camera system control unit 5 generates and outputs a timing signal for image pickup and the like and controls each of the imaging system, the image processing system, and the recording and reproducing system in response to an external operation. For example, the operation detection unit 10 detects a depression of a shutter release button (not shown) and the camera system control unit 5 controls the driving of the imaging element 6, the operation of the image processing unit 7, the compression processing of the memory unit 8, and the like. Further, the camera system control unit 5 controls a state of each segment of an information display apparatus for displaying information onto a liquid crystal monitor or the like by the display unit 9. Those control is realized by a method whereby the camera system control unit 5 loads a control program stored in a built-in memory (not shown) and executes it with reference to set data or the like. The adjusting operation of the optical system which is executed by the control system will now be described. The image processing unit 7 is connected to the camera system control unit 5, and a focus position and an iris position which are suitable to photographing conditions are determined on the basis of a signal from the imaging element 6 in accordance with the invention. The camera system control unit 5 transmits an instruction to the lens system control unit 12 through an electric connection 11. The lens system control unit 12 properly controls the lens drive unit 13 in response to the received instruction. Further, a vibration detection sensor (not shown) is connected to the lens system control unit 12. In a mode to perform a vibration correction, a vibration correction lens is properly controlled through the lens drive unit 13 on the basis of a signal from the vibration detection sensor.

Figure 2A:
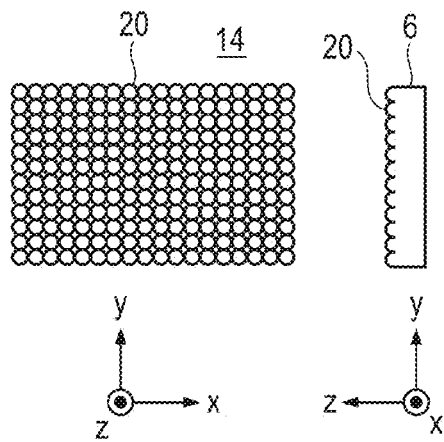
FIGS. 2A, 2B and 2C are diagrams for describing a main portion of a photographing optical system of the imaging apparatus in FIG. 1.
Figure 2C:
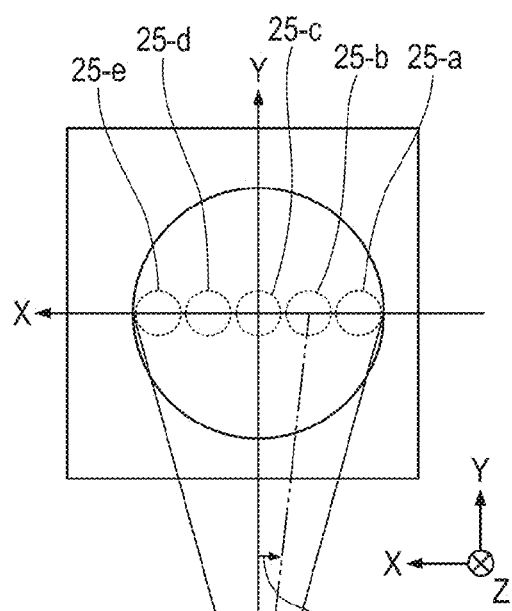
Figure 2B:
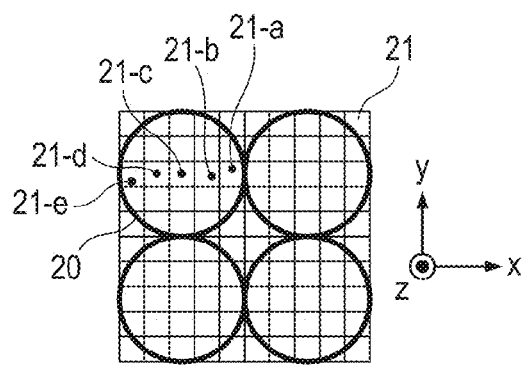

FIGS. 2A to 2C are diagrams for describing a main portion of the photographing optical system in the present embodiment. In the diagrams, portions similar to those in FIG. 1 are designated by the same reference numerals.

In the imaging apparatus to which the invention is applied, it is necessary to obtain information of an angle in addition to the position of a ray of light called "light field information" or the like. For this purpose, in the present embodiment, in order to obtain the angle information, the MLA 14 is arranged near the image pickup plane of the photographing optical system 3 and a plurality of pixels of the imaging element 6 are made to correspond to one ML constructing the MLA.

FIG. 2A is a diagram schematically illustrating a relation between the imaging element 6 and the MLA 14. FIG. 2B is a schematic diagram illustrating a correspondence between pixels 21 of the imaging element 6 and the MLA 14. FIG. 2C is a diagram illustrating a situation where the pixels arranged in correspondence to the MLA 14 are made to correspond to a specific pupil area by the MLA 14.

As illustrated in FIG. 2A, the MLA 14 is arranged on the imaging element 6 and a front principal point of an ML 20 is arranged near the image pickup plane of the photographing optical system 3. FIG. 2A schematically illustrates an external appearance in the case where the imaging apparatus is viewed from its side and the MLA 14 is viewed from its front. Each ML 20 of the MLA 14 is arranged so as to cover the pixel on the imaging element 6 when it is viewed from the front side of the imaging apparatus. Although each ML constructing the MLA 14 is largely illustrated in FIG. 2A so as to be easily recognized visually, actually, each ML has a size which is a few times as large as the pixel. The actual size will be described with reference to FIG. 2B.

FIG. 2B is a partially enlarged diagram of the diagram when viewed from the front side of the imaging apparatus of FIG. 2A. Lattice-shaped frames illustrated in FIG. 2B show each pixel 21 of the imaging element 6. Each ML 20 constructing the MLA 14 is shown by a bold circle. As will be obviously understood from FIG. 2B, a predetermined number of pixels are allocated to one ML. In the example of FIG. 2B, 25 (=5 rows×5 columns) pixels (collectively referred to as a unit pixel) are provided for one microlens. That is, although a size of each microlens is equal to a size which is 25 (=5×5) times as large as the pixel size, it is not limited to such a size.

FIG. 2C is a diagram of the imaging element 6 in the case where it is cut so as to contain an optical axis of the ML so that a longitudinal direction of the sensor is set to a lateral direction in the diagram. In FIG. 2C, pixels 21-*a*, 21-*b*, 21-*c*, 21-*d*, and 21-*e* (one photoelectric conversion unit) of the imaging element 6 are illustrated. A diagram shown in an upward position in FIG. 2C indicates an exit pupil plane of the photographing optical system 3. Actually, if the diagram of the sensor shown in a downward position in FIG. 2C and the direction are matched, the exit pupil plane (X-Y plane) is set to a direction perpendicular to the paper surface of FIG. 2C. However, a projecting direction is changed for easily understanding a description. In FIG. 2C, to simplify the description, a one-dimensional projection/signal processing will be described. In the actual apparatus, it can be easily expanded to two dimensions.

There is a correspondence positional relation between the pixels 21-*a*, 21-*b*, 21-*c*, 21-*d*, and 21-*e* in FIGS. 2C and 21-*a*, 21-*b*, 21-*c*, 21-*d*, and 21-*e* in FIG. 2B. As illustrated in FIG. 2C, each pixel is designed so as to be conjugate by the ML 20 with a specific exit pupil area on the exit pupil plane of the photographing optical system 3. In the example of FIG. 2C, an area 25-*a* corresponds to the pixel 21-*a*, an area 25-*b* corresponds to the pixel 21-*b*, an area 25-*c* corresponds to the pixel 21-*c*, an area 25-*d* corresponds to the pixel 21-*d*, and an area 25-*e* corresponds to the pixel 21-*e*, respectively. That is, only the ray of light which passes through the area 25-*a* on the exit pupil plane of the photographing optical system 3 enters the pixel 21-*a*. This is true of the other pixels. Consequently, the angle information of the object light can be obtained from the positional relation between the passing area on the pupil plane and the pixel on the imaging element 6.

Additional symbols are now introduced to simplify the following description. As illustrated in FIG. 2C, a pixel pitch of the imaging element 6 is assumed to be $\Delta x$ and an angular resolving power is assumed to be $\Delta \theta$. Further, a division number of the angle is assumed to be No (in the example of FIGS. 2A to 2C, $N_\theta$=5). The pixel pitch is determined in dependence on a shape of the imaging element 6. $\Delta \theta$ is determined by a range where an angle of the ray of light is obtained and the angle division number $N_\theta$. That is, those parameters are determined only by a physical structure (structure of the imaging element 6 and the ML 20).

In the optical system described with reference to FIGS. 2A to 2C, an angle of incidence of the ray of light can be specified by using the MLA. That is, by picking up the object image by using the optical system in FIGS. 2A to 2C, the angle information can be obtained in addition to the position of the incident light. In recent years, such information of the position and angle of the ray of light is called "light field information" and the imaging apparatus which can obtain the light field information is generally called a "light field camera" or "plenoptic camera".

The determining operation of the exposure condition in the imaging apparatus according to the present embodiment will now be described with reference to FIGS. 3 and 4A to 4E.

Figure 3:
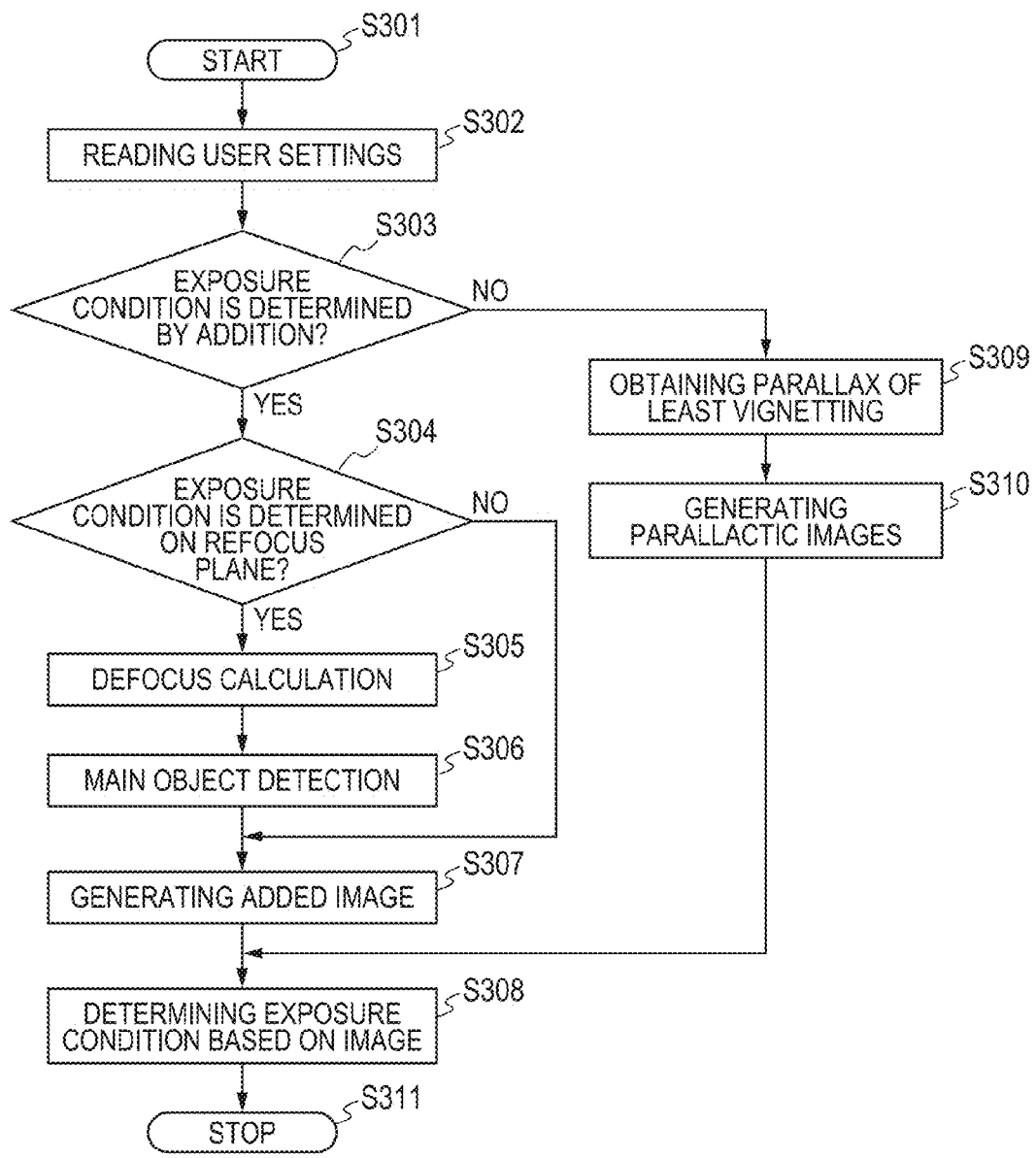
FIG. 3 is a diagram illustrating a flowchart for the operation of exposure determination control of the imaging apparatus according to the embodiment of the invention.

FIG. 3 illustrates a flowchart for the determining operation of the exposure condition in the imaging apparatus according to the present embodiment. The operation shown in the present embodiment will be sequentially described with reference to the flowchart of FIG. 3. The operation according to the flowchart of FIG. 3 is executed by a method whereby the camera system control unit 5 controls each unit.

In step S301, the camera system control unit 5 starts the operation. For example, the operation is started by using an output of the operation detection unit 10 or a time as a trigger.

In step S302, the camera system control unit 5 reads settings determined by a user setting unit. Those settings are used as a ground of a branch judgment in step S303 or S304, which will be described hereinafter. For this purpose, for example, in the photographing, information showing whether the user wants to perform the photographing at a continuous photographing speed-priority, wants to output a refocus image, wants to preferentially perform an anti noise scheme (noise reduction) due to vignetting, or the like is held as setting data of a setting data unit.

Although step S303 or S304 is the branch judgment about a technical construction to which the construction of the present embodiment is reflected, an actual interface does not relate to such a construction but may correspond to a function of the camera. For example, if an expression which can be easily understood as a function by the user such as "a priority is given to the continuous photographing speed" instead of an expression such as "an exposure is set on the basis of an added image". As an example of the settings made by the user, the camera system control unit 5 and the image processing unit 7 detect objects on the basis of the pixel data which is previously obtained and inform the detected object on a display screen, and the user selects one or a plurality of objects in which there is a possibility that they will be refocused later. Thus, at the time of a determination of the exposure condition at the post stage, a weight is added to signals from the pixels constructing each object on an in-focus plane so that the exposure is properly performed on the refocus plane which is in-focused onto the selected one or a plurality of objects, and the exposure condition is determined. As another example, the user inputs and sets his wishes about whether or not he wants to change the viewpoint later, thereby evaluating that the image of which viewpoint is important in accordance with the number of detected objects and their positions and orientations, a weight is added to signals from the pixels constructing the image of the important viewpoint, and the exposure condition is determined. When a plurality of objects are detected in a state where they are overlaid to the right and left, a large weight is added to the signals from the pixels at the right and left edges in the microlens, and the exposure condition is determined, so that the brightness of the viewpoint image corresponding to viewpoints to widely moved between the right and left can be set to a proper value.

In step S303, on the basis of the user settings which are read out in step S302, the camera system control unit 5 discriminates whether or not the exposure condition is determined on the basis of an addition signal (unit pixel data) or the exposure condition is determined on the basis of each parallactic image. In the case of deciding the exposure condition on the basis of the addition signal, step S304 follows. In the case of determining the exposure condition on the basis of each parallactic image, step S309 follows. A method of determining the exposure condition is not limited to such a method but the exposure condition may be determined in consideration of both of an added signal and a parallax signal. In such a case, it is sufficient to determine the final exposure condition by a method whereby a weight is added to the exposure condition determined by each of the added image and the parallactic image which are generated in steps S107 and S110 and the weighted exposure conditions are added, or the like.

In step S304, the camera system control unit 5 discriminates whether or not the exposure condition is obtained by a refocus plane. According to Ren Ng, et al., "Light Field Photography with a Hand-held Plenoptic Camera", 2005, Computer Science Technical Report CTSR, the foregoing imaging apparatus according to the embodiment can generate the pixel data which can be refocused. Since a refocusing method and the like have been disclosed in the prior art documents, their description is omitted here.

In the general imaging apparatus, a focus adjustment is performed by adjusting the photographing optical system 3 through the lens drive unit 13 of the lens unit 2. That is, the image focused on the imaging element 6 is an image in an in-focus state which is finally output and it is sufficient to determine the exposure condition in this state. On the other hand, the imaging apparatus according to the present embodiment has the following three exposure modes. That is, in the branch of steps S303 and S304, a case where the processing routine passes through step S309 corresponds to a first exposure mode, a case where the processing routine passes through step S304→step S307 corresponds to a second exposure mode, and a case where the processing routine passes through step S304→step S305 corresponds to a third exposure mode. In the present embodiment, those three exposure modes are selectively used in accordance with the user settings.

In the case where the user wants to give a priority to the continuous photographing speed, it is sufficient that the parallactic images are added and read out at the time of reading-out and the exposure condition is determined on the basis of the added image. By using such a method, the read-out and the continuous photographing can be performed at a high speed while suppressing a saturation of the added image (each parallactic image is based on the under exposure condition). In such a case, it is sufficient to use the second exposure mode.

On the other hand, in the case of the continuous photographing speed-priority, a noise reduction effect is sacrificed. In the case where the user wants to give a priority to the noise reduction, the parallactic images are read out separately at the time of reading-out and the exposure condition is determined on the basis of each parallactic image. By this method, the noises can be reduced by the addition combination after the reading-out while suppressing the saturation of the parallactic images (since the added image is based on the over exposure condition, there is a possibility of saturation). In such a case, it is sufficient to use the first exposure mode.

In the case of generating a final image by using the refocus, it is more convenient if the exposure condition is obtained by the refocus plane. In a state where the refocus is not performed, a blurred image is observed. This is because if the exposure condition is determined by such an image, when a spot photometry or the like is performed, there is a possibility that it becomes improper. In such a case, it is sufficient to use the third exposure mode.

The functions such as continuous photographing speed, noise reduction, and output of a final image in the refocus serving as judgment references in the determination of the exposure condition as mentioned above have been mentioned above as one example. The invention is not limited to them but it is sufficient to properly select the exposure mode in accordance with the function which the user wants to realize or the photographing settings. In the present embodiment, the user settings are confirmed in step S302 and the exposure condition suitable to a convenient reading method is determined.

Since the imaging apparatus according to the embodiment generates the pixel data which can be refocused, such a system that a part of the focus adjustment function is performed by an image processing is also considered. In such a system, if the exposure condition is obtained by adding the signal of the imaging element 6 as it is (without refocusing), there is a case where its result does not become proper. Specifically speaking, when a small and light bright spot exists within a range of determining the exposure condition, there is a large change in brightness distribution between a defocus state and an in-focus state. In the in-focus case, the bright spot portion is observed as a very light area. However, if the image is defocused, the bright spot portion is observed as an area where the brightness decreases largely (the brightness is averaged due to a defocus state). In this manner, the brightness distribution differs largely. Therefore, if an image on an image plane (refocus plane) which is finally output is formed in advance and the exposure condition is determined on the refocus plane, a refocus image which is output is obtained under the proper exposure condition. Such a method is, accordingly, convenient.

Therefore, it is sufficient to branch step S304 in accordance with the user settings about whether or not the user makes the focus adjustment by the refocus effective. If the focus adjustment by the refocus is made effective, step S305 follows. If the focus adjustment by the refocus is made ineffective, a refocus amount is set to 0 and step S307 follows.

In step S305, a defocus amount is calculated. This processing is substantially the same as a technique called "focus detection". By calculating the defocus amount, a deviation amount of the focus to the principal object is quantitatively grasped. In step S306, the camera system control unit 5 detects the principal object. It is sufficient to determine the object by the detection of the object from the image, an evaluation amount at the time of calculation of the defocus amount in step S305, or the like. The object detection from the image is well known as a face detection or the like. As a method of using step S305, it is sufficient to use a portion where a change amount of the evaluation value of the calculation of the defocus amount is large, a portion where it is determined that the evaluation amount is best, or the like. A position (depth) where the object exists can be known by steps S305 and S306 and an amount by which the image should be refocused is determined.

In step S307, the camera system control unit 5 generates an image on a plane corresponding to the refocus amount. Since the light field information has such a format that it is difficult for the user intuitively recognize it as it is, it is necessary to develop the image so that it can be handled in substantially the same manner as that of an ordinary image. "develop" mentioned here denotes such a processing operation that an operation to generate a re-formed image at an arbitrary refocus position from the light field information is executed to the pixel data. As specific contents, as disclosed in Ren Ng, et al., "Light Field Photography with a Hand-held Plenoptic Camera", 2005, Computer Science Technical Report CTSR, it is sufficient that the rays of light which enter the respective positions on the refocus plane are collected and integrated (added) with respect to the pupil plane, thereby generating a unit pixel on the plane. Step S307 relates to the operation to perform such a development and is a specific operation which is executed by an image generation unit in the camera system control unit 5. It is assumed that the user can set the refocus plane in the imaging apparatus according to the embodiment by a user setting unit.

Step S309 is a specific operation of a vignetting calculation unit in the camera system control unit 5, and a pixel (parallactic pixel) of the least vignetting is obtained. The operation of the vignetting calculation unit will be described hereinafter with reference to FIGS. 4A to 41E.

In step S310, the camera system control unit 5 generates parallactic images by the pixel selected in step S309. In step S308, the exposure condition is determined on the basis of the image obtained in step S307 or S310. The processing routine is finished in step S311.

Subsequently, the vignetting state of the optical system and the operation of the vignetting calculation unit will be described with reference to FIGS. 4A to 4E.

Figure 4A:
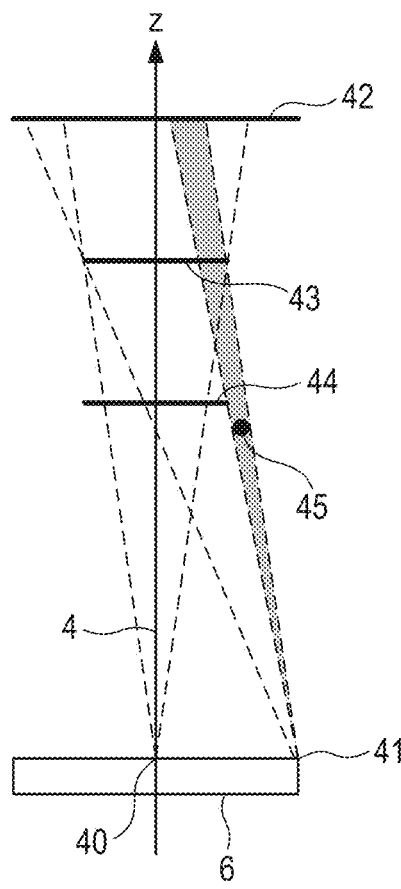
FIGS. 4A, 4B, 4C, 4D and 4E are diagrams for describing a state of vignetting of the optical system and the operation of a vignetting calculation unit.
Figure 4B:
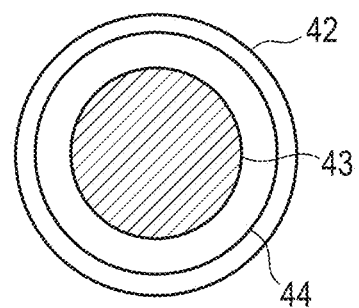
Figure 4C:
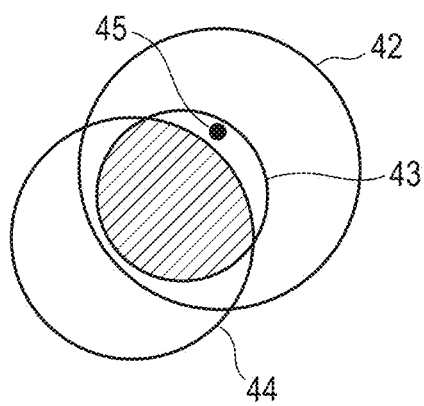
Figure 4D:
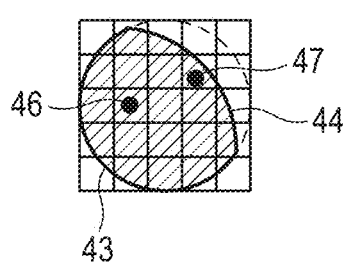
Figure 4E:
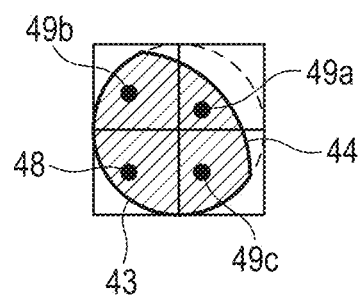

FIG. 4A schematically illustrates relations among the imaging element 6, an iris 43, various kinds of lens frames 42 and 44, and the vignetting. The lens frame is a part to perform a holding or the like of the lens, so that the lens frame may generally an edge plane which restricts the light rays in accordance with an image height although it does not restrict the light rays at a center 40 of picture plane. FIG. 4B is a diagram illustrating positional relations among the iris 43 and various kinds of lens frames 42 and 44 at the center 40 of picture plane. FIG. 4C is a diagram illustrating positional relations among the iris 43 and various kinds of lens frames 42 and 44 at one point 41 on the imaging element 6. FIGS. 4D and 4E are diagrams illustrating a correspondence between image pickup pixels and a vignetting in a state where there is the vignetting as illustrated in FIG. 4C, when viewed from a front side of the imaging apparatus in a manner similar to FIG. 2B.

Although one lens frame is shown on each of the imaging element 6 side and its opposite side for the iris 43 in FIG. 4A in order to easily understand a description, it is not always necessary to draw them one by one on each side. In FIG. 4A, a bold straight line showing the iris 43 one-dimensionally illustrates a size of aperture. Although the actual iris is almost circular, it is sufficient to consider that its diameter is schematically illustrated. This is true of the lens frames 42 and 44. When viewed from the center 40 of picture plane, as to the light ray directing toward the iris 43, no vignetting is caused by the lens frames 42 and 44. Such a case is illustrated in FIG. 4B. FIG. 4B is a diagram in the case where the iris 43 and the lens frames 42 and 44 are projected to the plane of the iris 43 for the center 40 of picture plane. At this time, since the iris 43 and the lens frames 42 and 44 form concentric circles and a diameter of the iris 43 is smallest, it will be understood that no vignetting is caused by the lens frames 42 and 44.

When viewed from the point 41 having a predetermined image height, there is a possibility that the vignetting is caused by the lens frames 42 and 44. In the example of FIGS. 4A to 4E, the vignetting is caused by the lens frame 44 existing on the imaging element 6 side. An area where the vignetting occurred is denoted with a reference numeral 45 in the diagram. In a manner similar to FIG. 4B, FIG. 4C is a diagram illustrating a case where the iris 43 and the lens frames 42 and 44 are projected to the plane of the iris 43 for the point 41. It will be understood that the vignetting is caused by the lens frame 44.

As will be understood from FIGS. 4A to 4C, factors which determine the state of vignetting are dominated by a pupil distance, a pupil diameter, an image height, a distance of the lens frame, a diameter of the lens frame, and the like serving as physical factors constructing the photographing optical system. The pupil distance is a distance between the imaging element 6 and the iris 43 in FIG. 4A. The pupil diameter is an F number and is a width of iris 43 in FIG. 4A. The image height is a position which is expressed by a comparison between the center 40 of picture plane and the point 41 on the imaging element 6 in FIG. 4A. The distance of the lens frame is a distance between the imaging element 6 and each of the lens frames 42 and 44 in FIG. 4A. The diameter of the lens frame is a width of each of the lens frames 42 and 44 in FIG. 4A. By obtaining those information by a communication with the lens or the like in accordance with the actual photographing conditions and properly executing a processing to them, the state of vignetting on the pupil plane is determined as illustrated in FIG. 4C. Thus, since the pixel in which the vignetting occurred can be specified in the unit pixel (5 rows×5 columns) corresponding to one ML, the parallactic images in which there is no influence by the vignetting can be generated. FIG. 4D illustrates a state of $N_\theta=5$ in the case where the 25 (=5×5) pixels correspond to one ML as shown in the example illustrated in FIGS. 2A to 2C. FIG. 4E illustrates a state of $N_\theta=2$.

As illustrated in FIG. 4D, when there is a vignetting, a pixel (parallax) in which the rays of light which enter are largely restricted exists. In the example of FIG. 4D, a pixel 46 is in a state where there is no vignetting and an aperture ratio is equal to 100%. It is defined that the aperture ratio is a ratio of an area where no vignetting occurs when the pixel is projected to the pupil plane to the pixel area. On the other hand, when an attention is paid to a pixel 47, although the aperture ratio ought to be equal to 100% in the state where there is no vignetting, a large vignetting exists in FIG. 4D. If the exposure condition is determined on the basis of the pixel in which the vignetting exists like a pixel 47, there is a risk that the pixel 46 having no vignetting is saturated. If the exposure condition is determined on the basis of the pixel 46 having no vignetting, the saturation can be avoided.

A method whereby a state of vignetting is presumed to use the pixel having the vignetting is also considered and the limitation of the parallactic image by step S309 is not always necessary. However, since only a small amount of light rays enters the pixel having a large vignetting, it is liable to be influenced by the noises and an error also occurs in the presumption of the vignetting state due to a dimensional error. That is, since such a method is influenced by an error of parts and the noises of the signal, it is not suitable to stably determine the exposure condition. It is, therefore, desirable to use the pixel in which a vignetting is small.

In the example of FIG. 4D, since there are a plurality of pixels (parallaxes) having no vignetting, it is sufficient to use a convenient one of them. For example, it is sufficient to select a pixel existing near the center of optical axis from the pixels having no vignetting.

In the example of FIG. 4E, since $N_\theta=2$, the pixels having no vignetting do not exist in spite of a fact that the vignetting state is the same as that in FIG. 4D. A pixel (parallax) having the least vignetting is denoted with a reference numeral 48. A vignetting of each of other pixels 49a, 49b, and 49c is larger than that of the pixel 48 due to the lens frame 44. In the example of FIG. 4E, it is sufficient to select the pixel 48.

As described with reference to FIGS. 4A to 4E, the vignetting calculation unit calculates the vignetting of each pixel (parallax) from the information such as pupil distance, pupil diameter, image height, distance of the lens frame, diameter of the lens frame, and the like obtained by the communication or the like.

As mentioned above, in the case where the user wants to give a priority to the continuous photographing speed, the second exposure mode is set and the exposure condition is determined on the basis of the added image (predetermined image). In the case where the user wants to give a priority to the noise reduction, the first exposure mode is set and the exposure condition is determined on the basis of each parallactic image (predetermined image). Further, in the case of outputting the refocus image (predetermined image), the third exposure mode is set and the exposure condition is determined on the basis of the added image (re-formed image).

Figure 5:
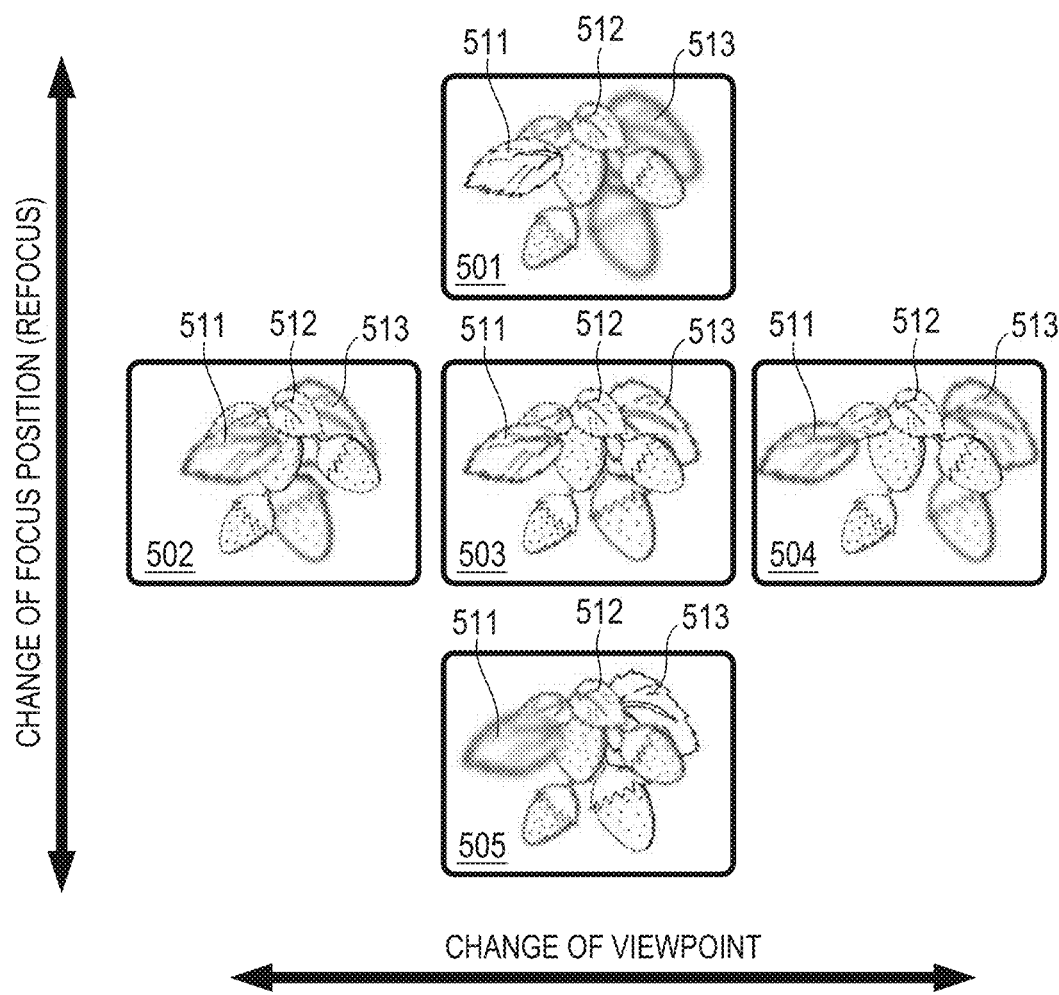
FIG. 5 is a diagram illustrating an example of images which are obtained by photographing in the imaging apparatus according to the embodiment of the invention.

An example of an application using a predetermined image which is obtained by the imaging apparatus according to the present embodiment by performing the exposure control of the embodiment will be described with reference to FIGS. 5, 6A and 6B. FIG. 5 illustrates five kinds of images 501, 502, 503, 504, and 505 generated by processing an image pickup signal obtained by the exposure of one time. Objects 511, 512, and 513 exist sequentially in those images from the side near the imaging apparatus, respectively. In the image layout of FIG. 5, a lateral direction corresponds to a change of a viewpoint and a vertical direction corresponds to a change (=what is called "refocus") of a focus position. That is, a set of the images 502, 503, and 504 is a combination of the images which are obtained after the viewpoint is changed. A set of the images 501, 503, and 505 is a combination of the images which are obtained after the focus position is changed.

When the set of the images 502, 503, and 504 obtained after the viewpoint is changed is viewed, although the position in the picture plane changes in accordance with the distance of the object, the focus is fixed to the center object 512. Such an image is effective for producing a sense of perspective with a false motion parallax, for example, or the like. As another example, in a device arranged such that images of different viewpoints can be displayed to right and left eyes, respectively, a stereoscopic viewing can be performed by displaying one set (=2 images) among the images obtained by the change of viewpoint.

When viewing the set of the images 501, 503, and 505 obtained after the focus position is changed, an in-focus object is an object 511 in the image 501, an in-focus object is an object 512 in the image 503, and an in-focus object is an object 513 in the image 505, respectively. However, the positions of the objects displayed in each image are not changed. Those images are effective for producing a new image expression by refocus, for example, or the like.

Subsequently, a construction of a specific signal processing of pixels in the case of generating the images illustrated in FIG. 5 will be described with reference to FIGS. 6A and 6B. FIG. 6A schematically illustrates the construction of the image processing in the case of obtaining the images in which the viewpoint is changed. FIG. 6B schematically illustrates the construction of the image processing in the case of obtaining the images in which the focus position is changed.

Figure 6A:
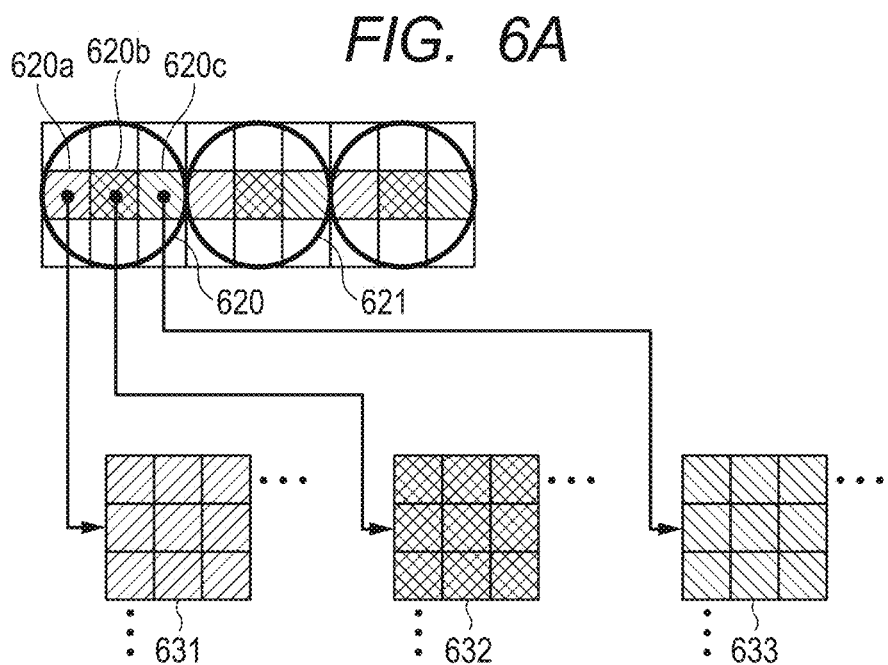
FIGS. 6A and 6B are diagrams schematically illustrating an image processing for generating the images illustrated in FIG. 5.
Figure 6B:
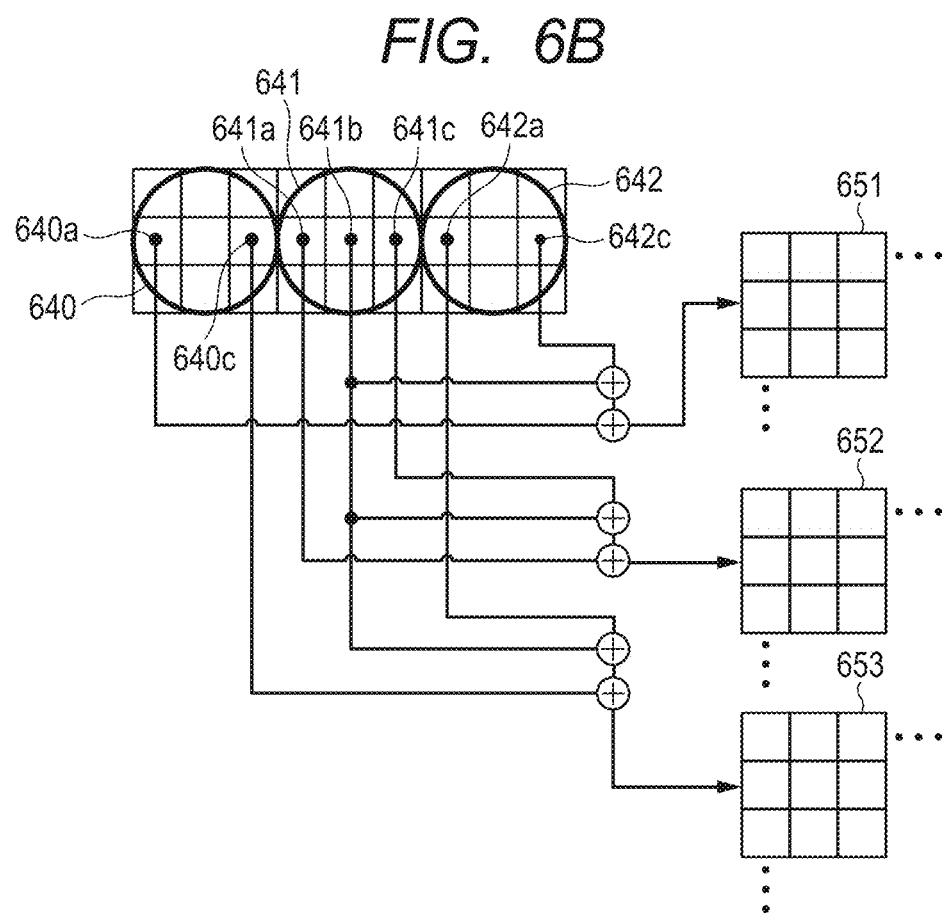

Three circles and lattices illustrated at upper stages in FIGS. 6A and 6B show microlenses and imaging elements viewed from the front side of the element in a manner similar to FIG. 2B. In FIGS. 6A and 6B, microlenses 620, 640, 641, and 642, pixels 620a, 620b, and 620c under the microlens 620, images 631, 632, and 633 of different viewpoints, and pixels 640a and 640c under the microlens 640 are illustrated, respectively. Pixels 641a, 641b, and 641c under the microlens 641, pixels 642a and 642c under the microlens 642, and images 651, 652, and 653 of different focus positions are illustrated, respectively. In FIGS. 6A and 6B, although a layout construction of $N_\theta=3$ in which 9 (=3×3) pixels correspond to one microlens is illustrated in order to simplify the description, naturally, the invention is not limited to such a layout construction in a manner similar to the case of FIGS. 2A to 2C.

A construction for generating the images of different viewpoints will now be described with reference to FIG. 6A. In the photographing optical system shown in the embodiment, as illustrated in FIG. 6A, the images of different viewpoints (=parallactic images) can be generated by collecting the pixels in which the relative positions are equal for each microlens. In the example of FIG. 6A, the images 631, 632, and 633 are images obtained by observing the object from different positions. As will be obviously understood from the generating construction of the parallactic images in FIG. 6A, the parallactic images are generated only by rearranging the pixel signals and there is no need to execute an arithmetic operation such as an addition or the like. This point differs from the generation of the refocus image, which will be described hereinafter. According to the exposure control operation of the embodiment described with reference to FIG. 3, a parallax of the least vignetting is obtained in step S309 and the parallactic images of the parallax selected in step S309 are generated in step S310. In the generating construction in FIG. 6A, this corresponds to a case where the pixel 620b locating at the center of the microlens 620 is selected and the pixels whose relative positions are equal are collected also for the other microlenses, and the image 632 is generated. After that, in step S308, the exposure condition is determined on the basis of the image 632. That is, the image 632 enters the proper exposure state. Thus, since each parallactic image properly enters the exposure state or does not enter the exposure state which is fairly improper although the object is exposed by a slightly small exposure amount, a photographed image which can be directly provided to an application accompanied with a change of viewpoint can be obtained.

A construction for generating the images whose focus positions are changed will now be described with reference to FIG. 6B. In the example illustrated in FIG. 6B, a description will be made on the assumption that the adding direction is limited to one axis in the lateral direction in order to simplify the description. That is, although the light field information is expressed by four dimensions (two dimensions of the angle+two dimensions of the position), a description will be made here by using only two dimensions (one dimension of the angle and one dimension of the position in the lateral direction in FIG. 6B) among the four dimensions.

In the photographing optical system shown in the present embodiment, as illustrated in FIG. 6B, by changing the phase to be added, the images whose focus positions are changed can be generated. In the example of FIG. 6B, the images 651, 652, and 653 are images whose focus positions differ. If the object is in-focused, the light rays from the same point on the object are focused to the same point irrespective of the pupil areas where the light rays pass. This is what is called an "in-focus state". For example, since the light rays from the same point on the object enter the microlens 641, a signal in which the pixels 641a, 641b, and 641c corresponding to the microlens 641 are added is generated and the image 652 is obtained also by arranging signals which are similarly generated with respect to the other microlenses. The image 652 is provided as an image (photographed image) in which the object which is in-focused by the microlens 641 is clearly seen. In the case of changing the focus position to a position different from the image 652, it is sufficient to change the phase to be added. For example, the pixel 640a which is far to and exists on the left side of the adjacent microlens 640 and the pixel 642c on the right side of the adjacent microlens 642 are added to the pixel 641b existing at the center of the microlens 641. The image 651 is obtained by arranging signals in which the pixels having a similar phase relation are added also for the other microlenses. The image 651 becomes an image which is in-focused to a position different from the image 652. Similarly, the image 653 is obtained by adding the pixels having phase relations such as 641b, 640c, and 642a. The images 653 and 651 become images (re-formed images) which are defocused in the opposite directions.

As described with reference to FIG. 6B, the change of the focus position is accompanied with the addition of the pixels. This is because in the imaging apparatus according to the present embodiment, the change of the focus position is accompanied with a convolution of the signals. That is, in the camera so far (=camera instead of the light field camera), the convolution of the light rays is performed by using only the lenses. However, in what is called a light field camera, a convolution processing is executed by the signal processing. If the signals which are added by the convolution correspond to the same point on the object as mentioned above, the object is in-focused. If they correspond to different points, the object is defocused.

In the exposure control operation shown in FIG. 3, although the added image is generated in step S307, it corresponds to the image 652 in FIG. 6B. In the case where the processing routine advances from step S304 through steps S305 and S306, the refocus state where the principal object is in-focused is selected. In FIG. 6B, any one of the images 651, 652, and 653 is selected in accordance with the focus state in step S307. After that, the exposure condition is determined on the basis of the images 651, 652, and 653 in step S308. That is, the images 651, 652, and 653 are in the proper exposure state.

As illustrated in FIGS. 6A and 6B, in the case of considering the operation to change the viewpoint and the operation to change the focus position, one of them is a processing which is not accompanied with the addition of the pixels and the other is accompanied with the addition of the pixels. That is, as compared with the images 631, 632, and 633, since the images 651, 652, and 653 are added images, their signal levels are high and they become what are called bright images. The invention is made to determine whether or not any one of those states is set into the proper exposure state, and the exposure state is determined so that the image can be more easily provided in accordance with the function which is preferentially selected by the user. By outputting the images used to determine the exposure state to the display unit 9 or the memory unit 8 under the control of the camera system control unit 5, the images illustrated in FIG. 5 can be used.

As described above, according to the invention, the imaging apparatus in which even if the apparatus is in a state where there is a vignetting of the photographing optical system, the exposure condition according to the photographing function which is preferentially set by the user can be determined can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-220217, filed Oct. 23, 2013, and 2014-185232, filed Sep. 11, 2014, which are hereby incorporated by reference herein in their entirety.

What is claimed is:

1. An imaging apparatus having an imaging element which has a plurality of pixels, each of which receives one of rays of light from one of a plurality of different exit pupil areas of a photographing optical system, comprising at least one processor that functions as:
    an exposure condition determination unit configured to determine an exposure condition of the imaging element on the basis of pixel data which is generated by photoelectrically converting the rays of light by the plurality of pixels; and
    a vignetting determination unit configured to determine a state of vignetting of the photographing optical system on the basis of information about a construction of the photographing optical system,
    wherein the exposure condition determination unit has a first exposure mode for determining the exposure condition on the basis of the pixel data selected, in accordance with the state of vignetting, from the pixel data which is generated by photoelectrically converting the rays of light by the plurality of pixels, and a second exposure mode for deciding the exposure condition on the basis of data obtained by adding, with respect to the exit pupil areas, the pixel data which is generated by photoelectrically converting the rays of light by the plurality of pixels.

2. The apparatus according to claim 1, wherein the at least one processor further functions as a setting unit configured to receive settings made by a user, and
    wherein the exposure condition determination unit switches the first exposure mode and the second exposure mode on the basis of the settings made by the user, and the settings by the user include settings regarding at least a continuous photographing speed, an output of a re-formed image, and an anti noise scheme in the determination of the exposure condition.

3. The apparatus according to claim 1, wherein the at least one processor further functions as an image generation unit configured to generate, in accordance with the exposure mode, a predetermined image from the pixel data which is generated by photoelectrically converting the rays of light by the plurality of pixels, and
wherein the exposure condition determination unit determines the exposure condition on the basis of the predetermined image.

4. The apparatus according to claim 3, wherein the predetermined image which is generated by the image generation unit in the first exposure mode is a parallactic image, and when the exposure condition determination unit switches the exposure mode to the first exposure mode, the image generation unit generates the parallactic image from the pixel data selected on the basis of the determined state of vignetting in accordance with a ratio between a pixel area in each pixel and an area where no vignetting occurs.

5. The apparatus according to claim 3, wherein the predetermined image which is generated by the image generation unit in the second exposure mode is a photographed image.

6. The apparatus according to claim 2, wherein the exposure condition determination unit further has a third exposure mode for determining the exposure condition on the basis of a re-formed image generated from the pixel data which is generated by photoelectrically converting the rays of light by the plurality of pixels, and
wherein the first exposure mode, the second exposure mode, and the third exposure mode are switched on the basis of the settings made by the user.

7. The apparatus according to claim 6, wherein the at least one processor further functions as an image generation unit configured to generate, in accordance with the exposure mode, a predetermined image from the pixel data which is generated by photoelectrically converting the rays of light by the plurality of pixels,
wherein the predetermined image which is generated by the image generation unit in the third exposure mode is the re-formed image, and when the exposure condition determination unit switches the exposure mode to the third exposure mode, in accordance with an image plane which is set by the setting unit, the image generation unit calculates a defocus amount of an optical image by using the pixel data which is generated by photoelectrically converting the rays of light by the plurality of pixels and, on the basis of the calculated defocus amount, selects and adds the pixel data, which is generated by photoelectrically converting the rays of light by the plurality of pixels, thereby generating the re-formed image.

8. The apparatus according to claim 6, further comprising a microlens array in which microlenses are two-dimensionally arranged, wherein each of the microlenses corresponds to a predetermined number of pixels among the plurality of pixels of the imaging element, the selection of the pixel data in the first exposure mode is a selection of predetermined pixel data of the pixels among the predetermined number of pixels corresponding to each microlens, and the addition of the pixel data in the second exposure mode is an addition of the pixel data with respect to the predetermined number of pixels corresponding to each microlens.

9. The apparatus according to claim 8, wherein the selection of the pixel data in the third exposure mode is a selection of the pixel data corresponding to the pixels of the re-formed image on an image plane from the pixel data which is generated by photoelectrically converting the rays of light by the plurality of pixels from among the predetermined number of pixels.

10. The apparatus according to claim 3, further comprising:
a display unit configured to-display the predetermined image which is output from the image generation unit; and
a memory unit configured to store the predetermined image which is output from the image generation unit.

11. The apparatus according to claim 1, wherein the photographing optical system includes an iris, and the information about the construction of the photographing optical system includes information of a distance between the imaging element and the iris, an F number, a distance between a frame of a photographing lens of the photographing optical system and the imaging element, and an image height.

12. A control method of an imaging apparatus having an imaging element which has a plurality of pixels each of which receives one of rays of light from one of a plurality of different exit pupil areas of a photographing optical system, comprising:
an exposure condition determination step of determining an exposure condition of the imaging element on the basis of pixel data which is generated by photoelectrically converting the rays of light by the plurality of pixels; and
a vignetting determination step of determining a state of vignetting of the photographing optical system on the basis of information about a construction of the photographing optical system,
wherein the exposure condition determination step has a first exposure mode for determining the exposure condition on the basis of the pixel data selected, in accordance with the state of vignetting, from the pixel data which is generated by photoelectrically converting the rays of light by the plurality of pixels, and a second exposure mode for deciding the exposure condition on the basis of data obtained by adding, with respect to the exit pupil areas, the pixel data which is generated by photoelectrically converting the rays of light by the plurality of pixels.

13. A non-transitory computer-readable storage medium storing a program for causing a computer to execute the control method according to claim 12.

14. An imaging apparatus having an imaging element which has a plurality of pixels each of which receives one of rays of light from one of a plurality of different exit pupil areas of a photographing optical system, comprising at least one processor that functions as:
a vignetting determination unit configured to determine a state of vignetting of the photographing optical system on the basis of information about a construction of the photographing optical system,
an exposure condition determination unit configured to determine an exposure condition of the imaging element on the basis of pixel data which is obtained from pixels corresponding to a part of the exit pupil areas; and
a control unit configured to control an exposure of the imaging element on the basis of the exposure condition determined by the exposure condition determination unit,
wherein the exposure condition determination unit determines the exposure condition on the basis of the pixel data selected, in accordance with the state of vignetting, from the pixel data which is generated by photoelectrically converting the rays of light by the plurality of pixels.

15. The imaging apparatus according to claim 14, wherein the photographing optical system includes an iris, and information about a construction of the photographing optical system includes information of a distance between the imaging element and the iris, an F number, a distance between a frame of a photographing lens of the photographing optical system and the imaging element, and an image height.

16. The imaging apparatus according to claim 14, further comprising a microlens array in which microlenses are two-dimensionally arranged, each of the microlenses corresponding to a predetermined number of pixels among the plurality of pixels of the imaging element.

17. The imaging apparatus according to claim 16, wherein selection of the pixel data in a first exposure mode includes a selection of predetermined pixel data of the pixels among the predetermined number of pixels corresponding to each microlens.

* * * * *